US009380178B2

(12) United States Patent
Takai (10) Patent No.: US 9,380,178 B2
(45) Date of Patent: Jun. 28, 2016

(54) DISPLAY INPUT APPARATUS, IMAGE FORMING APPARATUS HAVING THE SAME, AND METHOD FOR CONTROLLING THE DISPLAY INPUT APPARATUS

(71) Applicant: KYOCERA Document Solutions Inc., Osaka (JP)

(72) Inventor: Kenji Takai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/539,608

(22) Filed: Nov. 12, 2014

(65) Prior Publication Data

US 2015/0146247 A1      May 28, 2015

(30) Foreign Application Priority Data

Nov. 26, 2013   (JP) ................................. 2013-243968

(51) Int. Cl.
    *G06F 15/00*    (2006.01)
    *H04N 1/00*    (2006.01)
    *G06F 3/0484*    (2013.01)
    *G06F 3/0488*    (2013.01)

(52) U.S. Cl.
    CPC ........ *H04N 1/00395* (2013.01); *G06F 3/04847* (2013.01); *G06F 3/04883* (2013.01); *G06F 3/04886* (2013.01); *H04N 1/00392* (2013.01); *H04N 1/00411* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2001/0024196 A1 | 9/2001 | Nishizawa | 345/173 |
| 2003/0070437 A1 | 4/2003 | Hafner et al. | 62/127 |
| 2011/0234518 A1 | 9/2011 | Maruyama | 345/173 |
| 2013/0077119 A1* | 3/2013 | Arai | 358/1.13 |
| 2013/0097551 A1* | 4/2013 | Hogan | 715/780 |
| 2013/0235070 A1* | 9/2013 | Webb | 345/594 |
| 2014/0351698 A1* | 11/2014 | Nakagawa | G06F 3/0485 715/702 |

FOREIGN PATENT DOCUMENTS

| | | |
|---|---|---|
| JP | 2010-56221 A | 3/2010 |
| JP | 2011-198165 A | 10/2011 |
| JP | 2000-245981 A | 9/2012 |
| JP | 2001-315179 A | 11/2013 |
| JP | 2003-159928 A | 6/2015 |

* cited by examiner

*Primary Examiner* — Helen Q Zong
(74) *Attorney, Agent, or Firm* — Stein IP, LLC (57) ABSTRACT

Upon accepting a region dividing operation, a display input apparatus sets a line, which passes through a predetermined region, as a first reference line; sets an end edge of the predetermined region, which is opposite to the first reference line, as a second reference line; obtains a ratio for input numerical value calculation, namely, a ratio of a distance from the first reference line to the second reference line and a distance from the first reference line to a division line of the predetermined region divided by the region dividing operation; obtains a numerical value by multiplying a maximum value or minimum value in a numerical value input range by the ratio for input numerical value calculation, and displays the obtained numerical value in a numerical value input screen.

10 Claims, 9 Drawing Sheets

DISPLAY INPUT APPARATUS, IMAGE FORMING APPARATUS HAVING THE SAME, AND METHOD FOR CONTROLLING THE DISPLAY INPUT APPARATUS

INCORPORATION BY REFERENCE

The present application is based on and claims the benefit of priority from Japanese Patent Application No. 2013-243968 filed on Nov. 26, 2013, the contents of which are hereby incorporated by reference.

BACKGROUND OF THE INVENTION

The present disclosure relates to a display input apparatus, an image forming apparatus including the same, and a method for controlling the display input apparatus.

Conventionally, as a display input apparatus, a display apparatus with a touch panel is known which is installed in image forming apparatuses such as a multi-functional machine and the like, and is called an operation panel, for example. Such an operation panel accepts operations for setting and changing set values for various kinds of setting items relevant to operation of an image forming apparatus.

There are setting items relevant to operation of an image forming apparatus that require a numerical value input when setting and changing a set value. In an example, a numerical value input becomes necessary when setting and changing the number of copies and a copy magnification. Accordingly, conventionally, when accepting a numerical value input, a numeric key pad is displayed as a software key on an operation panel. In this way, it is possible to input a desired numerical value by operating the numeric key pad (software key).

In the operation panel that displays the numeric key pad (software key) to accept a numerical value input, for example, upon performing a tap operation (operation like tapping with a finger) on any one of numerical value keys of "0" to "9," a numerical value corresponding to the tapped numerical value key is input. However, according to this structure, in a case of inputting a two- or more-digit numerical value, it is necessary to perform the tap operation on numerical value keys two times or more. Accordingly, it is onerous and inconvenient for a user.

In the meantime, as another example, there is an operation panel which displays a numerical value increase/decrease key (software key) including a plus key and a minus key when accepting a numerical value input. For example, upon performing the tap operation on the plus key one time, an input numerical value increases 1, while upon performing the tap operation on the minus key one time, an input numerical value decreases 1. However, according to this structure, it is necessary to perform the tap operation on the numerical value increase/decrease key many times until an input numerical value becomes a desired value. Further, it takes a long time until the input numerical value becomes the desired value.

SUMMARY OF THE INVENTION

A display input apparatus according to a first aspect of the present disclosure includes a display portion, a touch panel portion, and a control portion. The display portion displays an input numerical value input screen for accepting an input of a numerical value and displays an input numerical value, namely, a numerical value that is input, in the numerical value input screen. The touch panel portion is disposed correspondingly to the display portion and accepts a predetermined region dividing operation on a screen of the display portion. The control portion detects, based on an output from the touch panel portion, the touch operation accepted by the touch panel portion. And, when the touch panel portion accepts a predetermined region dividing operation as a touch operation that divides a predetermined region in the numerical value input screen along a second direction that meets a first direction at right angles, the control portion sets a line, which passes through a predetermined position of the predetermined region in the second direction, as a first reference line; sets an end edge, which is opposite to the first reference line of the predetermined region in the first direction, as a second reference line; obtains a ratio for input numerical value calculation that is a ratio of a distance from the first reference line to the second reference line and a distance from the first reference line to a division line of the predetermined region that is divided by the region dividing operation; and obtains a numerical value, which is obtained by multiplying a maximum value or minimum value in a numerical value input range of the numerical value input screen by the ratio for input numerical value calculation, as the input numerical value. Besides, the display portion displays the input numerical value, which is obtained by the control portion, in the numerical value input screen.

An image forming apparatus according to a second aspect of the present disclosure includes the above display input apparatus.

A method for controlling a display input apparatus according to a third aspect of the present disclosure is a method for controlling a display input apparatus that includes: a display portion which displays a numerical value input screen for accepting an input of a numerical value and displays an input numerical value, namely, a numerical value that is input, in the numerical value input screen; and a touch panel portion which is disposed correspondingly to the display portion and accepts a touch operation on a screen of the display portion, the method comprising: a step in which when the touch panel portion accepts a predetermined region dividing operation as a touch operation that divides a predetermined region in the numerical value input screen along a second direction which meets a first direction at right tangles, a line, which passes through a predetermined position of the predetermined region in the second direction, is set as a first reference line, an end edge opposite, in the first direction, to the first reference line of the predetermined region is set as a second reference line, whereby a ratio for input numerical value calculation is obtained, which is, namely, a ratio of a distance from the first reference line to the second reference line and a distance from the first reference line to a division line of the predetermined region divided by the region dividing operation, and a numerical value, which is obtained by multiplying a maximum value or minimum value in a numerical value input range of the numerical value input screen by the ratio for input numerical value calculation, is obtained as the input numerical value, and; a step in which the obtained input numerical value is displayed in the numerical value input screen.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

As to an embodiment of the present disclosure, an example of a multi-functional machine is described which can execute various kinds of jobs such as a copy job, a print job, a transmission job and the like.

<Whole Structure of Multi-Functional Machine>

Figure 1:
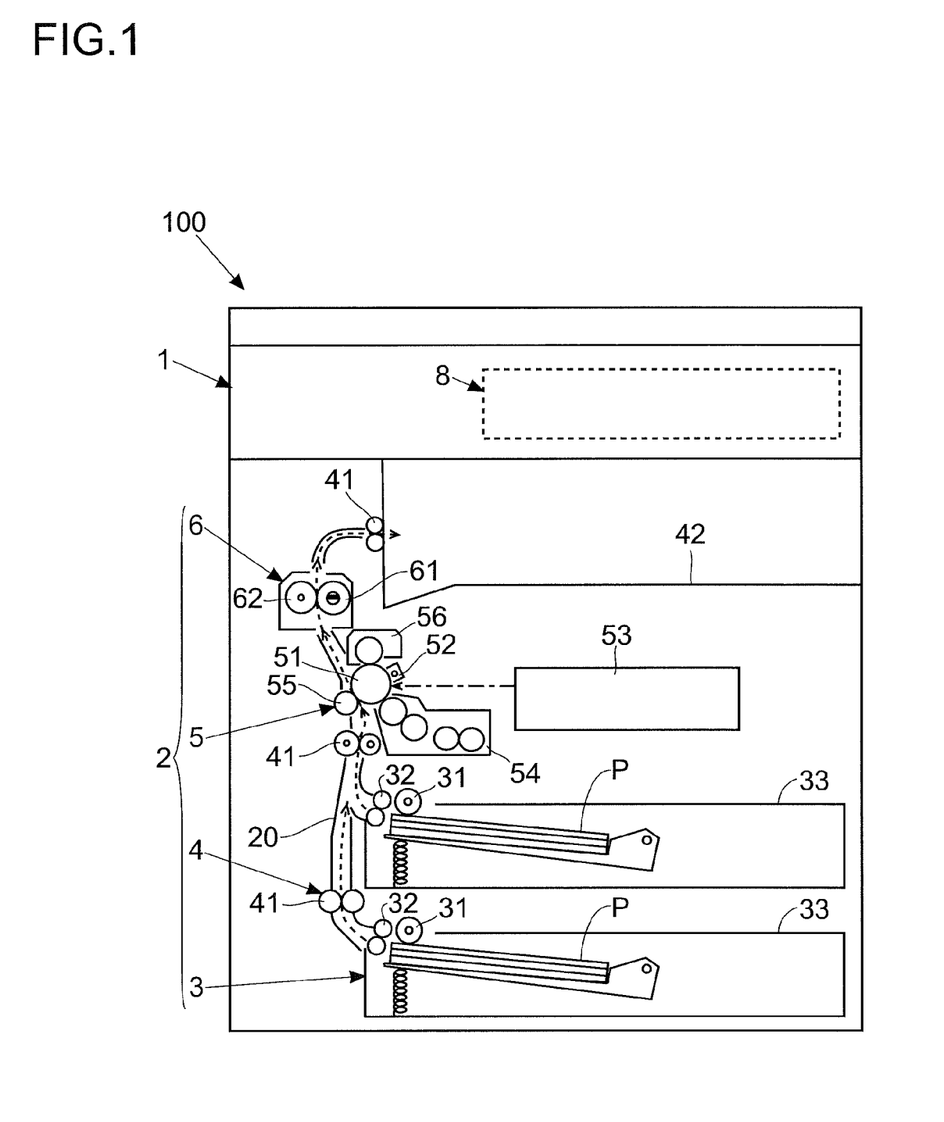
FIG. 1 is a schematic view showing an example of a multi-functional machine that includes an operation panel according to an embodiment of the present disclosure.

As shown in FIG. 1, a multi-functional machine 100 (which corresponds to an "image forming apparatus") includes an image reading portion 1 and a printing portion 2. The image reading portion 1 reads a document to generate image data. For example, the image data obtained by reading of the image forming portion 1 is transmittable to an external apparatus (transmission job).

The printing portion 2 prints an image based on image data onto a paper sheet P and outputs the paper sheet. For example, the printing portion 2 prints an image, which is based on image data obtained by the image reading portion 1 reading a document, onto the paper sheet P and outputs the paper sheet (copy job). Or, the printing portion 2 prints an image, which is based on image data transmitted from an external apparatus, onto the paper sheet P and outputs the paper sheet (print job).

The printing portion 2 is composed of a paper sheet feeding portion 3, a paper sheet conveying portion 4, an image forming portion 5, and a fixing portion 6. The paper sheet feeding portion 3 includes a pickup roller 31 and a pair of paper sheet feeding rollers 32, and supplies the paper sheet P housed in a paper sheet cassette 33 to a paper sheet conveying path 20. The paper sheet conveying portion 4 includes a plurality of pairs of conveying rollers 41, conveys the paper sheet P along the paper sheet conveying path 20, and delivers the printed paper sheet P onto a delivery tray 42.

The image forming portion 5 includes a photosensitive drum 51, a charging device 52, an exposure device 53, a developing device 54, a transfer roller 55, and a cleaning device 56. And, the image forming portion 5 forms a toner image based on image data, and transfers the toner image to the paper sheet P. The fixing portion 6 includes a heat roller 61 and a pressure roller 62, heats and pressures the toner image transferred to the paper sheet P to fix the toner image.

Figure 2:
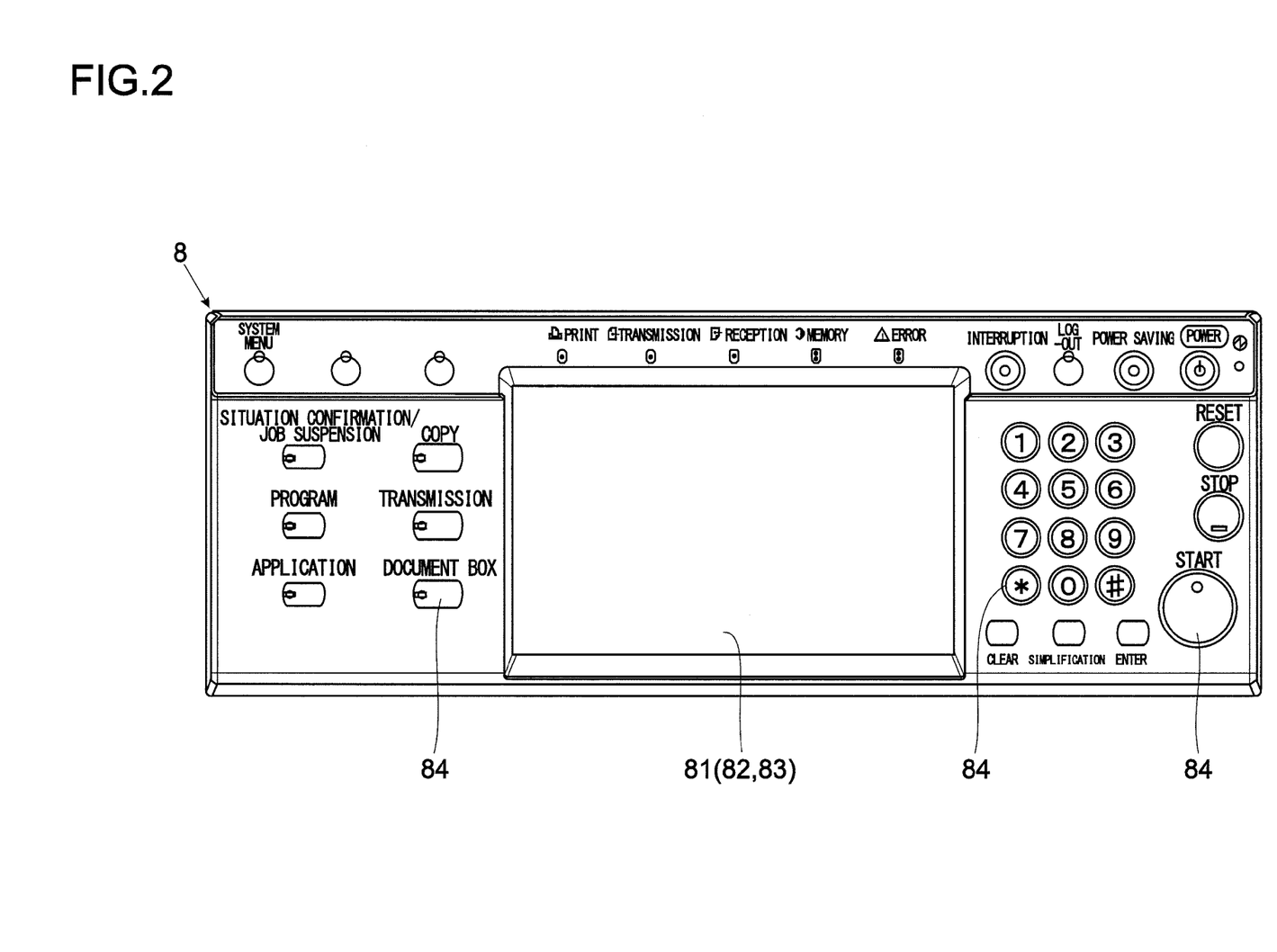
FIG. 2 is a plan view of an operation panel according to an embodiment of the present disclosure.

Besides, the multi-functional machine 100 includes an operational panel 8 shown in FIG. 2. The operation panel 8 is disposed on a front side (e.g., a place indicate by a broken line of FIG. 1) of the multi-functional machine 100. In the meantime, the operation panel 8 corresponds to a "display input apparatus."

The operation panel 8 is provided with an operation display portion 81. The operation display portion 81 includes a display portion 82 and a touch panel portion 83. The display portion 82 is a display panel such as a liquid crystal display panel, an organic EL display panel or the like. The touch panel portion 83 is a multi-touch panel that can detect simultaneously a plurality of touch positions, and is disposed to cover a display surface of the display portion 82. And, the operation display portion 81 displays buttons (software keys) for accepting various kinds of settings and a message on the display portion 82, and accepts various kinds of settings via the touch panel portion 83. In the meantime, the operation panel 8 is also provided with various kinds of hardware keys such as a start key, a stop key, a reset key, a numeric key pad and the like.

<Hardware Structure of Multi-Functional Machine>

Figure 3:
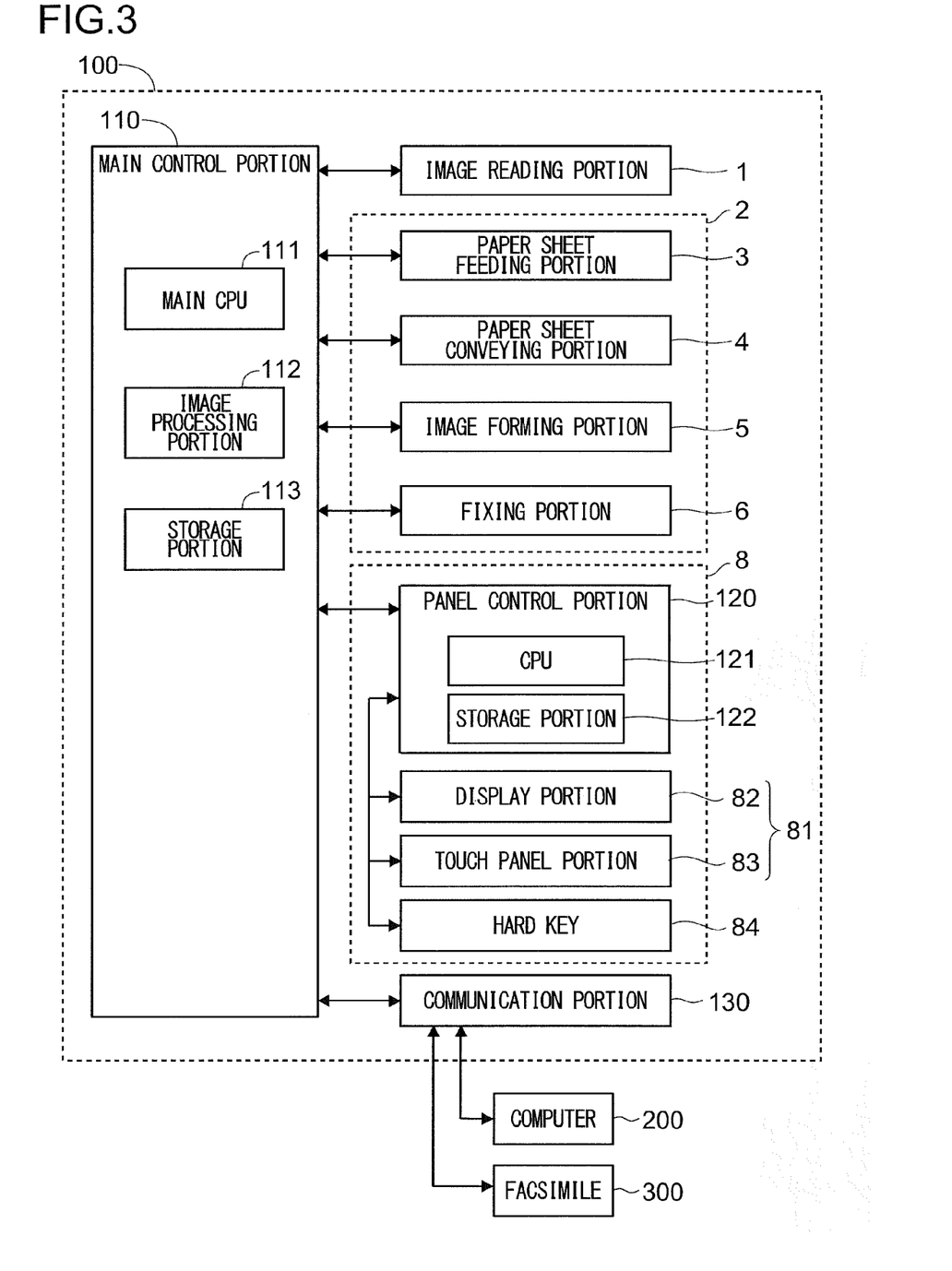
FIG. 3 is a block diagram showing an example of a hardware structure of a multi-functional machine that includes an operation panel according to an embodiment of the present disclosure.

As show in FIG. 3, the multi-functional machine 100 includes a main control portion 110. The main control portion 110 includes a main CPU 111, an image processing portion 112, and a storage portion 113. The image processing portion 112 includes an ASIC dedicated to image processing and the like, and applies image processings (enlargement/reduction, concentration conversion, data format conversion and the like) to image data. The storage portion 113 includes a ROM, a RAM and the like, and stores a program for control and data. And, the main control portion 110 controls operation of each portion of the multi-functional machine 100 based on the program and data stored in the storage portion 113.

Specifically, the main control portion 110 is connected to the image reading portion 1 and the printing portion 2 (paper sheet feeding portion 3, paper sheet conveying portion 4, image forming portion 5, and fixing portion 6). And, the main control portion 110 controls a reading operation of the image reading portion 1 and controls a printing operation of the printing portion 2.

Besides, the main control portion 110 is connected to a panel control portion 120. The panel control portion 120 includes a CPU 121 and a storage portion 122, receives instructions from the main control portion 110 to control a display operation of the operation panel 8 and detects an operation performed on the operation panel 8. For example, the panel control portion 120 makes the display portion 82 display a button (software key), if a touch operation is performed on the button, detects, based on an output from the touch panel portion 83, the button that accepts the touch operation. Besides, if a push-down operation of pushing down the hardware key 84 is performed, based on an output from a switch that is switched in on/off by the push-down of the hardware key 84, the panel control portion 120 detects the hardware key 84 that accepts the push-down operation.

Besides, the main control portion 110 is connected to a communication portion 130. The communication portion 130 is communicably connected to external apparatuses (computer 200 and facsimile 300). And, the communication portion 130 receives an instruction from the main control portion 110 and performs transmission/reception of image data with the external apparatuses.

<Numerical Value Input on Numerical Value Input Screen>

(Numerical Value Input by Using Numerical Value Increase/Decrease Button)

When necessary, the operation panel 8 accepts a numerical value input from a user. For example, when setting a copy magnification at an arbitrary magnification (magnification other than standard magnification) and setting a document reading size at an arbitrary size (size other than standard size), it is necessary to input numerical values as the copy magnification and the document reading size. Besides, when setting the maximum holding number of image data transmitted from the external apparatus, it is necessary to input a numerical value as the maximum holding number. Besides, when setting an identification number to be allocated to an address registered in an address book, it is necessary to input a numerical value as the identification number. Further, in a case where a power saving mode (sleep mode) is incorporated in the multi-functional machine 100, it becomes necessary to input a numerical value when setting a period located before a time the power saving mode starts to work. In the meantime, the setting items described here that require numerical value inputs are examples, and there are many other setting items that require numerical value inputs.

Figure 4:
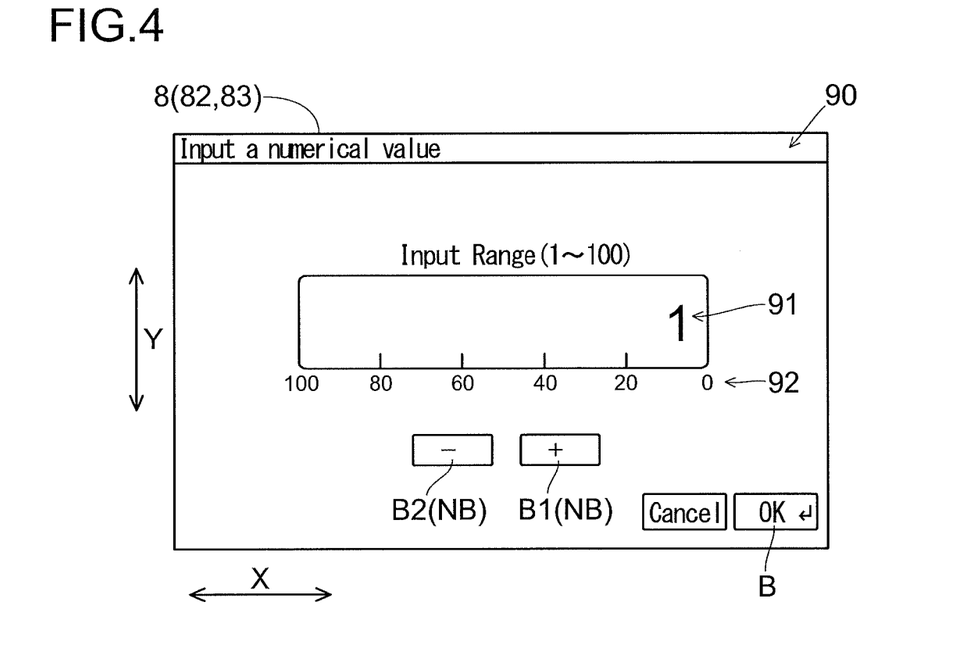
FIG. 4 is a view showing an example of a numerical value input screen that is displayed on an operation panel according to an embodiment of the present disclosure.

When accepting a numerical value input, the panel control portion 120 makes the display portion 82 display a numerical value input screen 90 shown in FIG. 4. And, the panel control portion 120 makes the touch panel portion 83 accept the numerical value input. In the meantime, the numerical value input screen 90 shown in FIG. 4 is an example, and it is possible to change a screen layout and the like.

The numerical value input screen 90 includes a numerical value display region 91 for displaying a numerical value (hereinafter, called an input numerical value) input by the user. This numerical value display region 91 is formed to have a substantially rectangular shape that is long in a left-right direction when seeing from an apparatus front side. In the meantime, the numerical value display region 91 corresponds to a "predetermined region." Besides, a long-edge direction (left-right direction) of the numerical value display region 91 corresponds to a "first direction," while a short-edge direction, which meets the long-edge direction of the numerical value display region 91 at right angles, corresponds to a "second direction." In the following description, the long-edge direction (first direction) of the numerical value display region 91 is called an X direction, while the short-edge (second direction) direction of the numerical value display region 91 is called a Y direction.

Besides, the numerical value input screen 90 is provided with a numerical value increase/decrease button NB that includes a plus button B1 and a minus button B2. And, based on an output from the touch panel portion 83, the panel control portion 120 detects a tap operation (operation like tapping with a finger) on the numerical value increase/decrease button NB.

If the tap operation is performed on the plus button B1 one time, the panel control portion 120 makes the display portion 82 display a numerical value, which is obtained by adding "1" to an input numerical value in current display, as a new input numerical value; if the tap operation is performed on the minus button B2 one time, the panel control portion 120 makes the display portion 82 display a numerical value, which is obtained by subtracting "1" from an input numerical value in current display, as a new input numerical value.

(Numerical Value Input without Using Numerical Value Increase/Decrease Button)

Figure 5:
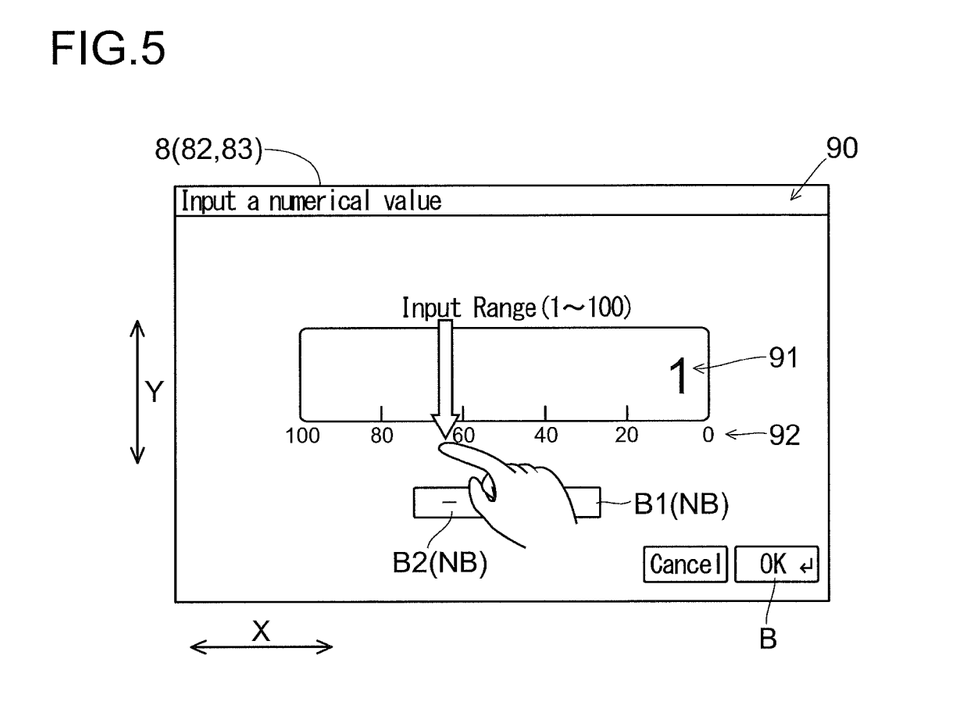
FIG. 5 is a view for describing a region dividing operation (operation for inputting a numerical value) that is performed on an operation panel according to an embodiment of the present disclosure.

When the display portion 82 displays the numerical value input screen 90, the panel control portion 120 detects whether a region dividing operation is performed on the touch panel portion 83 or not. In the meantime, a region dividing operation is predetermined as a touch operation that divides the numerical value display region 91 along the Y direction. For example, as shown in FIG. 5, the touch panel portion 83 accepts a touch operation (operation called a slide operation or the like), which slides a touch position to divide the numerical value display region 91 along the Y direction, as a region dividing operation. And, upon detecting a region dividing operation on the touch panel portion 83, the panel control portion 120 obtains a division ratio of the numerical value display region 91 divided by the region dividing operation.

Figure 6:
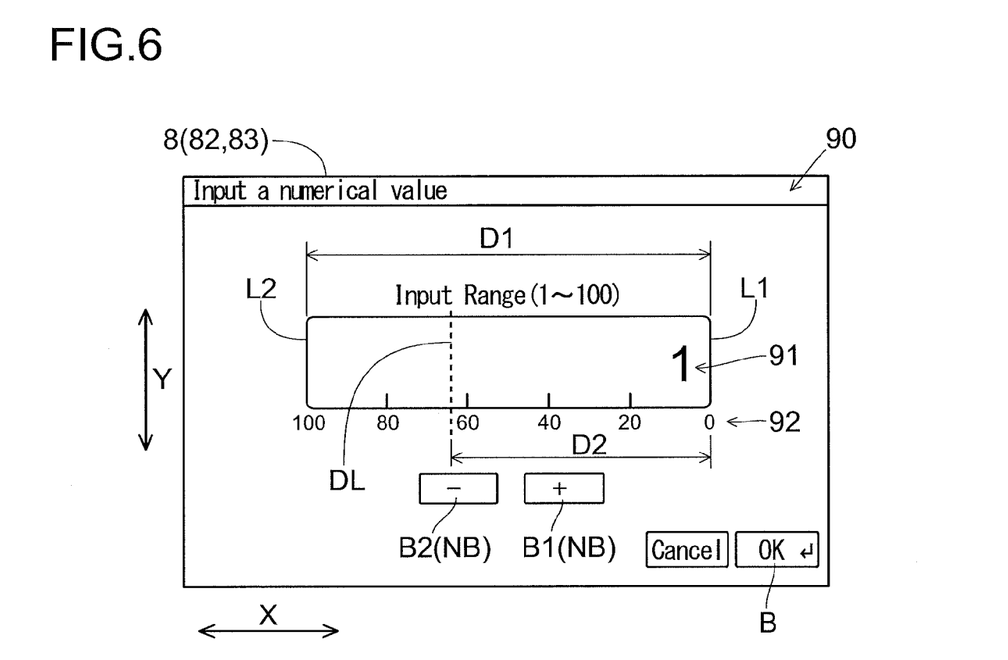
FIG. 6 is a view for describing a region dividing operation that is performed on an operation panel according to an embodiment of the present disclosure.
Figure 7:
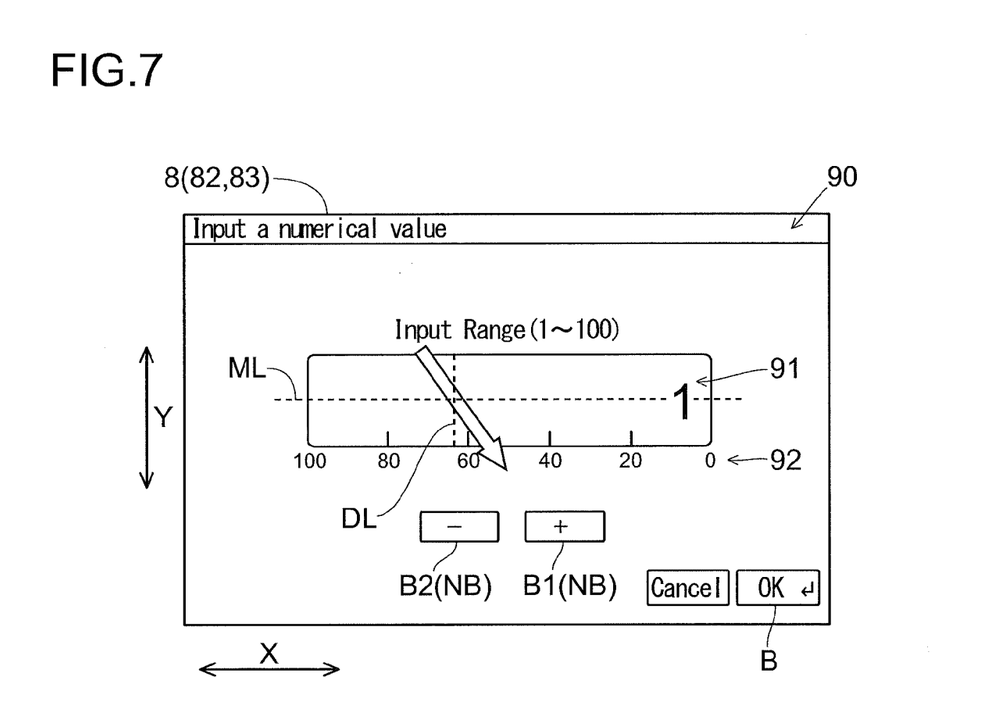
FIG. 7 is a view for describing a region dividing operation that is performed on an operation panel according to an embodiment of the present disclosure.

At this time, as shown in FIG. 6, the panel control portion 120 identifies a division line DL of the numerical value display region 91 divided by the region dividing operation. This division line DL is a line that is along the Y direction and substantially overlaid on the slide direction of the touch position at the time of region dividing operation. In the meantime, as shown in FIG. 7, there is a case where the slide direction (white arrow direction in FIG. 7) of the touch position at the time of region dividing operation deviates from the Y direction. Because of this, for example, the touch panel portion 120 sets beforehand an intermediate line ML that extends in the X direction between upper and lower edges of the numerical value display region 91, and identifies a line, which passes, in the Y direction, through an intersection between the line along the slide direction of the touch position at the time of region dividing operation and the intermediate line ML, as the division line DL. Or, a line, which passes, in the Y direction, through an intersection between the line along the slide direction of the touch position at the time of region dividing operation and the upper edge or lower edge of the numerical value display region 91, may be set as the division line DL.

Back to FIG. 6, when obtaining the division ratio of the numerical value display region 91, the panel control portion 120 sets a line (line extending along the Y direction), which passes through a predetermined position of the numerical value display region 91 in the Y direction, as a first reference line L1, and sets an end edge (edge extending along the Y direction) of the numerical value display region 91 opposite to the first reference line L1 in the X direction, as a second reference line L2. At this time, if a numerical value input range of the numerical value input screen 90 does not bridge a positive value and a negative value, the panel control portion 120 sets one-side (right side) end edge as the first reference line L1 which is one of both end edges of the numerical value display region 91 opposite to each other in the X direction, and sets the other-side (left side) end edge as the second reference line L2 which is the other one of both end edges of the numerical value display region 91 opposite to each other in the X direction. And, the panel control portion 120 obtains a ratio of a distance D1 from the first reference line L1 to the second reference line L2 and a distance D2 from the first reference line L1 to the division line DL as a division ratio of the numerical value display region 91. The division ratio of the numerical value display region 91 obtained here corresponds to a "ratio for input numerical value calculation," and is called a ratio for input numerical value calculation in the following description.

Upon obtaining the ratio for input numerical value calculation, the panel control portion 120 calculates an input numerical value based on the ratio for input numerical value calculation. Specifically, the panel control portion 120 obtains a numerical value, which is obtained by multiplying a maximum value or minimum value in the numerical value input range of the numerical value input screen 90 by the ratio for input numerical value calculation, as an input numerical value. And, the panel control portion 120 makes the display portion 82 display the obtained input numerical value.

According to such a structure, by performing the region dividing operation such that the ratio (ratio for input numerical value calculation) of the distance D2 from the first reference line L1 to the division line DL of the numerical value display region 91 to the distance D1 from the first reference line L1 to the second reference line L2 becomes equal to a ratio of a desired value (numerical value to be input) to the maximum value or minimum value in the numerical value input range of the numerical value input screen 90, it becomes possible to input the desired value by means of only one operation. In this way, operations at the time of numerical value input decrease; accordingly, convenience for the user improves.

Besides, the touch operation, which slides the touch position to divide the numerical value display region 91 along the Y direction, is used as the region dividing operation; accordingly, the region dividing operation becomes straightforward and easy to understand. In the meantime, the touch operation, which slides the touch position to divide the numerical value display region 91 along the Y direction, may be used as the region dividing operation; however, a tap operation of tapping the numerical value display region 91 only one time may be used as the region dividing operation. In this case, a line, which passes through the tap position at the time of region dividing operation in the Y direction, may be used as the division line DL of the numerical value display region 91.

Besides, the region dividing operation is accepted by means of the numerical value display region 91; accordingly, it is unnecessary to additionally secure a region, in the numerical value input screen 90, for accepting the region dividing operation. In this way, the degree of freedom of layout of the numerical value input screen 90 increases. However, the region dividing operation may be accepted by means of a region other than the numerical value display region 91 in the numerical value input screen 90.

Besides, the end edge on the one side of the numerical value display region 91 in the X direction and the end edge on the other side of the numerical value display region 91 in the X direction are set as the first reference line L1 and the second reference line L2, respectively; accordingly, it becomes easy to understand which position of the numerical value display region 91 should be used as a reference to perform the region dividing operation.

Figure 8:
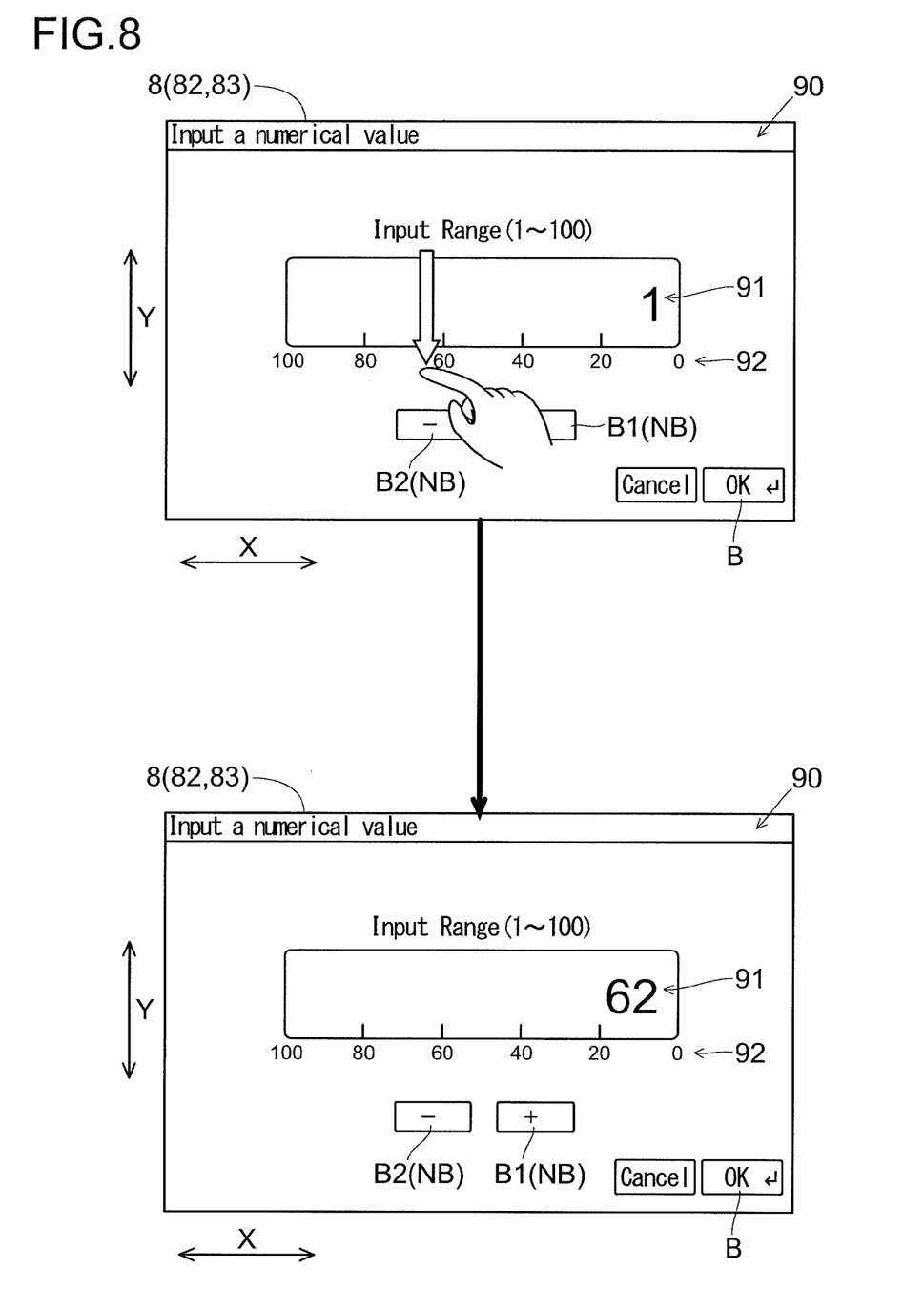
FIG. 8 is a view for describing a region dividing operation that is performed on an operation panel according to an embodiment of the present disclosure.

Here, in a case where the values in the input range of the numerical value input screen 90 are only positive values, the panel control portion 120 obtains a numerical value, which is obtained by multiplying the maximum value in the numerical value input range by the ratio for input numerical value calculation, as the input numerical value. As an example, as shown in FIG. 8, it is assumed that in the numerical value input screen 90 having a numerical value input range of "1" to "100," the region dividing operation is performed such that the ratio of the distance D2 to the distance D1 becomes 0.62. In this case, the maximum value in the numerical value input range is "100"; accordingly, the input numerical value obtained by the panel control portion 120 becomes "62 (=100×0.62)." In this way, the display portion 82 displays "62" as the input numerical value.

Besides, in a case where the values in the input range of the numerical value input screen 90 are only negative values, the panel control portion 120 obtains a numerical value, which is obtained by multiplying the minimum value in the numerical value input range by the ratio for input numerical value calculation, as the input numerical value. As an example, although not shown, it is assumed that in the numerical value input screen 90 having a numerical value input range of "−1" to "−100," the region dividing operation is performed such that the ratio of the distance D2 to the distance D1 becomes 0.62. In this case, the minimum value in the numerical value input range is "−100"; accordingly, the input numerical value obtained by the panel control portion 120 becomes "−62 (=−100×0.62)." In the meantime, in the case where the numerical values in the input range of the numerical value input screen 90 are only negative values, of both end edges (both end edges extending along the Y direction) of the numerical value display region 91 opposite to each other in the X direction, the end edge on the one side (right side) may be set as the second reference line L2, and the end edge on the other side (left side) may be set as the first reference line L1 (they may be reversed to the case where the numerical values in the numerical value input range of the numerical value input screen 90 are only positive values).

Further, there is a case where the numerical value input range of the numerical value input screen 90 bridge a positive value and a negative value. In this case, the panel control portion 120 sets a line, which passes, in the Y direction, through a position between both end edges of the numerical value display region 91 opposite to each other in the X direction, as the first reference line L1. And, if the region dividing operation is performed on one side of the numerical value display region 91 in the X direction with respect to the first reference line L1, the panel control portion 120 sets the end edge on the one side of the numerical value display region 91 as the second reference line L2 to obtain the ratio for input numerical value calculation, and obtains a numerical value, which is obtained by multiplying the maximum positive value in the numerical value input range of the numerical value input screen 90 by the ratio for input numerical value calculation, as the input numerical value. On the other hand, if the region dividing operation is performed on the other side of the numerical value display region 91 opposite to the one side, the panel control portion 120 sets the end edge on the other side of the numerical value display region 91 as the second reference line L2 to obtain the ratio for input numerical value calculation, and obtains a numerical value, which is obtained by multiplying the minimum negative value in the numerical value input range of the numerical value input screen 90 by the ratio for input numerical value calculation, as the input numerical value.

According to such a structure, even in the case where the numerical value input range of the numerical value input screen 90 bridges a positive value and a negative value, it is possible to selectively input any one of the positive value and negative value by means of only one region dividing operation.

Figure 9:
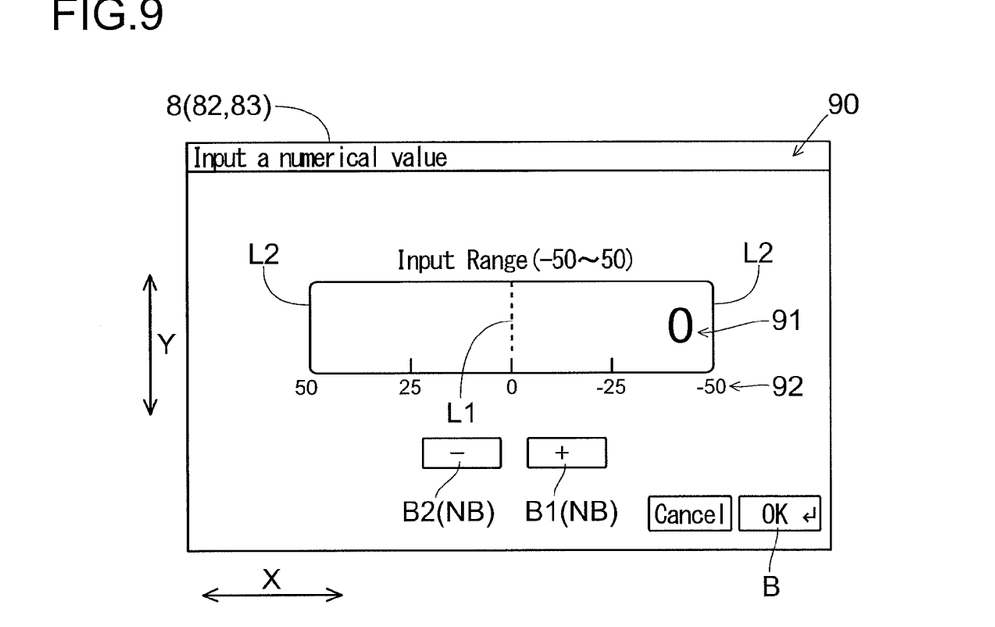
FIG. 9 is a view for describing a region dividing operation that is performed on an operation panel according to an embodiment of the present disclosure.

As an example, as shown in FIG. 9, it is assumed that the numerical value input screen 90 has a numerical value input range of "−50" to "50." In this case, for example, the panel control portion 120 sets a line, which passes, in the Y direction, through a middle position between both end edges of the numerical value display region 91 opposite to each other in the X direction, as the first reference line L1. And, in a case where the region dividing operation is performed on one side (left side) of the numerical value display region 91 with respect to the first reference line L1, the panel control portion 120 sets the end edge on the one side of the numerical value display region 91 as the second reference line L2 to obtain the ratio for input numerical value calculation, and obtains a numerical value, which is obtained by multiplying the maximum positive value "50" in the numerical value input range of the numerical value input screen 90 by the ratio for input numerical value calculation, as the input numerical value. On the other hand, in a case where the region dividing operation is performed on the other side (right side) of the numerical value display region 91 with respect to the first reference line L1, the panel control portion 120 sets the end edge on the other side of the numerical value display region 91 as the second reference line L2 to obtain the ratio for input numerical value calculation, and obtains a numerical value, which is obtained by multiplying the minimum negative value "−50" in the numerical value input range of the numerical value input screen 90 by the ratio for input numerical value calculation, as the input numerical value.

In the meantime, for example, in the numerical value input screen 90 (see FIG. 4 to FIG. 8) that has the numerical value input range of "1" to "100," if a touch operation, which slides the touch position along the end edge of the numerical value display region 91 used as the second reference line L2, is performed as the region dividing operation, the second reference line L2 and the division line DL are overlaid on each other. In other words, the ratio for input numerical value calculation, which is the ratio of the distance D1 and the distance D2, becomes "1." Accordingly, by sliding the touch position along the end edge of the numerical value display region 91 used as the second reference line L2, it is possible to input the maximum value "100 (=100×1)." As another example, in the case where the numerical value input range is from "−1" to "−100," it is possible to input the minimum value "−100 (=−100×1)."

In the meantime, in the numerical value input screen 90 having the numerical value input range of "1" to "100," if a touch operation, which slides the touch position along the end edge of the numerical value display region 91 used as the first reference line L1, is performed as the region dividing operation, the first reference line L1 and the division line DL are overlaid on each other, and the input numerical value obtained by the panel control portion 120 becomes "0" which is outside the numerical value input range. In such a case, the panel control portion 120 does not make the display portion 82 display the obtained numerical value. Besides, in this case, the display portion 82 performs at least one notification of a notification of being unable to input a numerical value and a notification of prompting a re-input of a numerical value (displays a notification message).

(Scale Display)

The panel control portion 120 makes the display portion 82 display a scale 92 (see FIG. 4 to FIG. 9) that serves as a reference as to what value is input in a case where the region dividing operation is performed on the touch panel portion 83. For example, the scale 92 is disposed on the lower edge of the upper and lower edges of the numerical value display region 91. Or, although not shown, the scale 92 may be disposed on the upper edge of the upper and lower edges of the numerical value display region 91.

When displaying the scale 92, the display portion 82 divides the numerical value display region 91 at a predetermined division position. And, the display portion 82 displays a numerical value, which is used as the input numerical value in a case where the region dividing operation is performed to divide the numerical value display region 91 along a line that passes through the division position in the Y direction, as the scale 92.

According to such a structure, it is possible to perform the region dividing operation by using the scale 92 as the reference; accordingly, the input numerical value does not become a numerical value that is dramatically far from a desired value.

For example, in the case where the numerical value input screen 90 has the numerical value input range of "1" to "100," although not especially limited, as shown in FIG. 4 to FIG. 8, the numerical value display region 91 is divided into 5 sections at equal intervals (there are four division positions). And, in this case, numerical values as the scales 92 respectively disposed at the four division positions are "80," "60," "40," and "20" in order from the division position on one side (left side). In the meantime, a numerical value "0" may be attached as the scale 92 to the position of the end edge of the numerical value display region 91 used as the first reference line L1, and a numerical value "100" may be attached as the scale 92 to the position of the end edge of the numerical value display region 91 used as the second reference line L2.

Here, in the case where the numerical value input range bridges a positive value and a negative value (case where a line, which passes, in the Y direction, through a position between both end edges of the numerical value display region 91 opposite to each other in the X direction, is used as the first reference line L1), it is hard for the user to understand which position should be used as the reference to perform the region dividing operation. Accordingly, in this case, as shown in FIG. 9, it is preferable that a division position is set at the position (position where the input numerical value becomes "0" when the region dividing operation is performed) of the first reference line L1 at the least and a numerical value "0" is attached as the scale 92 to the division position. As an example, FIG. 9 shows, besides the position of the first reference line L1, the scale 92 which uses, as division positions, a position where the input numerical value becomes "25" when the region dividing operation is performed and a position where the input numerical value becomes "−25" when the region dividing operation is performed.

(Fine Adjustment of Input Numerical Value)

The panel control portion 120 detects a region dividing operation on the touch panel portion 83 and makes the display portion 82 display the input numerical value that is obtained in accordance with the region dividing operation, thereafter, makes the touch panel portion 83 accept a predetermined numerical value increase/decrease operation as a touch operation of increasing/decreasing (fine adjustment) the input numerical value in current display until a predetermined period (e.g., a few seconds to more than ten seconds) elapses. For example, the touch panel portion 83 accepts the region dividing operation, thereafter, accepts a region dividing operation, which is accepted again by a time the predetermined period elapses, as the numerical value increase/decrease operation.

Figure 10:
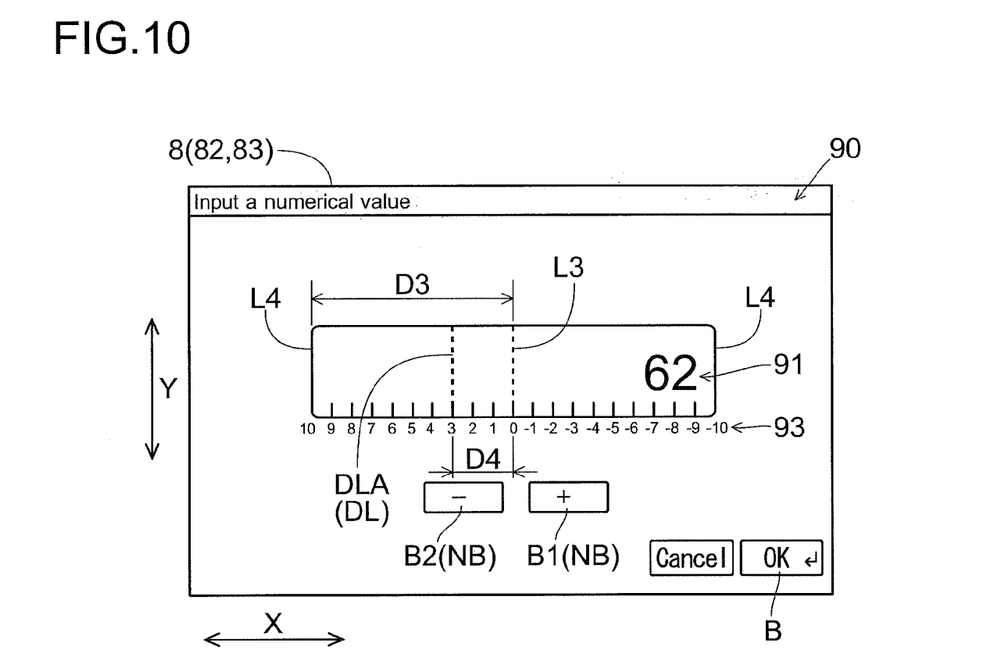
FIG. 10 is a view for describing a numerical value increase/decrease operation (operation for increasing/decreasing an input numerical value) that is performed on an operation panel according to an embodiment of the present disclosure.

When making the touch panel portion 83 accept the numerical value increase/decrease operation until the predetermined period elapses, as shown in FIG. 10, the panel control portion 120 sets a line (line extending along the Y direction), which passes, in the Y direction, through a predetermined position between both end edges of the numerical value display region 91 opposite to each other in the X direction, as a third reference line L3. For example, at the time of accepting the numerical value increase/decrease operation, a line, which passes, in the Y direction, through a middle position between both end edges of the numerical display region 91 opposing the X direction, is set as the third reference line L3.

At this time, if the touch panel portion 83 accepts the numerical value increase/decrease operation (if the touch panel portion 83 accepts again the region dividing operation before the predetermined period elapses), the panel control portion 120 identifies the division line DL of the numerical value display region 91 divided by the numerical value increase/decrease operation. Hereinafter, the division line DL of the numerical value display region 91 divided by the numerical value increase/decrease operation is called a division line DLA.

And, in a case where the numerical value increase/decrease operation is performed on one side (here, left side) of the numerical value display region 91 in the X direction with respect to the third reference line L3, the panel control portion 120 sets the end edge on the one side of the numerical value display region 91 as a fourth reference line L4, and obtains a ratio of a distance D3 from the third reference line L3 to the fourth reference line L4 and a distance D4 from the third reference line L3 to the division line DLA of the numerical value display region 91 divided by the numerical value increase/decrease operation as a division ratio of the numerical value display region 91. The division ratio of the numerical value display region 91 obtained here corresponds to a "ratio for increase/decrease value calculation," and it is called a ratio for increase/decrease value calculation in the following description.

Thereafter, the panel control portion 120 calculates an input numerical value after the increase/decrease based on the ratio for increase/decrease value calculation. Specifically, the panel control portion 120 multiplies a predetermined increase/decrease value by the ratio for increase/decrease value calculation, and obtains a numerical value, which is obtained by increasing the input numerical value in current display by the numerical value obtained by the multiplication, as the input numerical value after the increase/decrease. In the meantime, the predetermined increase/decrease value is a predetermined numerical value, but can be changed in accordance with the numerical value input range of the numerical value input screen 90 (e.g., the larger the numerical value input range of the numerical value input screen 90 is, the larger the predetermined increase/decrease value may be made).

On the other hand, in a case where the numerical value increase/decrease operation is performed on the other side (here, right side) of the numerical value display region 91 opposite to the one side in the X direction with respect to the third reference line L3, the panel control portion 120 sets the end edge on the other side of the numerical value display region 91 as the fourth reference line L4, and obtains the ratio for increase/decrease value calculation. Thereafter, the panel control portion 120 obtains a numerical value, which is obtained by decreasing the input numerical value in current display by a numerical value obtained by multiplying the predetermined increase/decrease value by the ratio for increase/decrease value calculation, as the input numerical value after the increase/decrease.

Upon obtaining the input numerical value after the increase/decrease, the panel control portion 120 makes the display portion 82 display the input numerical value after the increase/decrease. In other words, the display portion 82 newly displays the input numerical value after the increase/decrease instead of the input numerical value in current display.

According to such a structure, by only performing again the region dividing operation (numerical value increase/decrease operation) by the time the predetermined period elapses, it is possible to increase/decrease (fine adjustment) the input numerical value. In other words, when finely adjusting the input numerical value, it is unnecessary to perform many times the operation of increasing/decreasing the input numerical value by tapping the numerical value increase/decrease button NB.

Figure 11:
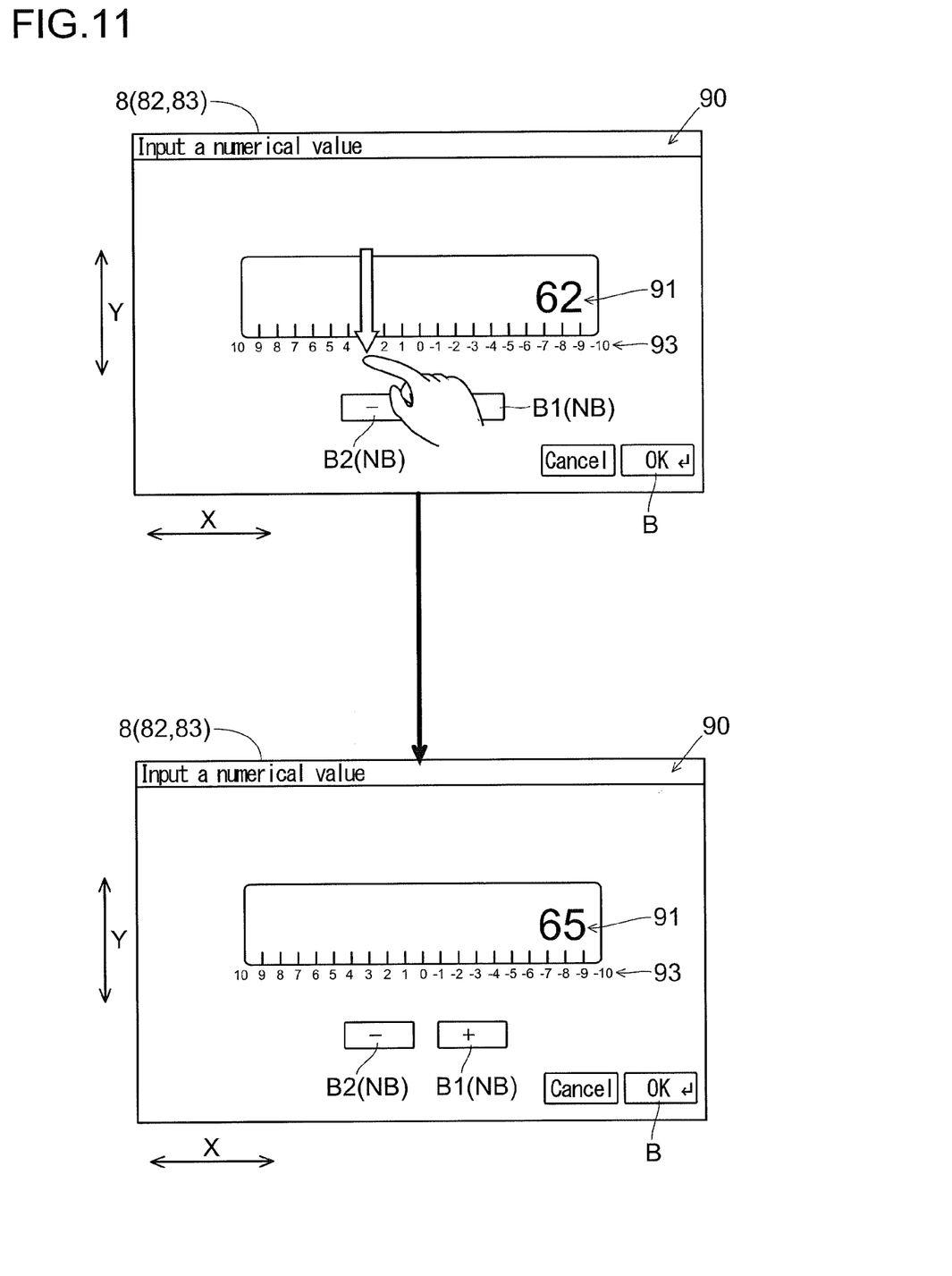
FIG. 11 is a view for describing a numerical value increase/decrease operation that is performed on an operation panel according to an embodiment of the present disclosure.

For example, as shown in FIG. 11, it is assumed that in the numerical value input screen 90 where the predetermined increase/decrease value is set at "10," "62" is in current display as the input numerical value in accordance with the region dividing operation performed already. Further, it is assumed that the numerical value increase/decrease operation is performed on one side with respect to the third reference line L3 and the ratio of the distance D4 to the distance D3 is "0.3." In this case, the ratio for increase/decrease value calculation becomes "0.3," and the numerical value obtained by multiplying the predetermined increase/decrease value "10" by the ratio "0.3" for increase/decrease value calculation becomes "3 (=10×0.3)"; accordingly, the input numerical value after the increase/decrease obtained by the panel control portion 120 becomes "65 (=62+3)." Accordingly, the display portion 82 switches the input numerical value from "62" to "65" to display "65."

Besides, when making the touch panel portion 83 accept the numerical value increase/decrease operation, the panel control portion 120 makes the display portion 82 display a scale 93 (see FIG. 10 to FIG. 11) that serves as a reference to indicate by what value the input numerical value in current display increases or decreases in the case where the numerical value increase/decrease operation is performed on the touch panel portion 83. For example, the scale 93 is disposed on the lower edge of the upper and lower edges of the numerical value display region 91. Or, although not shown, the scale 93 may be disposed on the upper edge of the upper and lower edges of the numerical value display region 91.

When displaying the scale 93, the display portion 82 divides the numerical value display region 91 at a predetermined division position. And, the display portion 82 displays a numerical value, which indicates by what value the input numerical value in current display increases or decreases in a case where the numerical value increase/decrease operation is performed to divide the numerical value display region 91 along a line that passes through the division position in the Y direction, as the scale 93.

In the meantime, after a numerical value is input by means of the region dividing operation, it is also possible to perform the fine adjustment of the input numerical value by means of an operation on the numerical value increase/decrease button NB. Or, the fine adjustment of the input numerical value is performed by means of the numerical value increase/decrease operation, thereafter, it is also possible to further perform the fine adjustment of the input numerical value by means of an operation on the numerical value increase/decrease button NB.

(Control Flow when Accepting Numerical Value Input)

Figure 12:
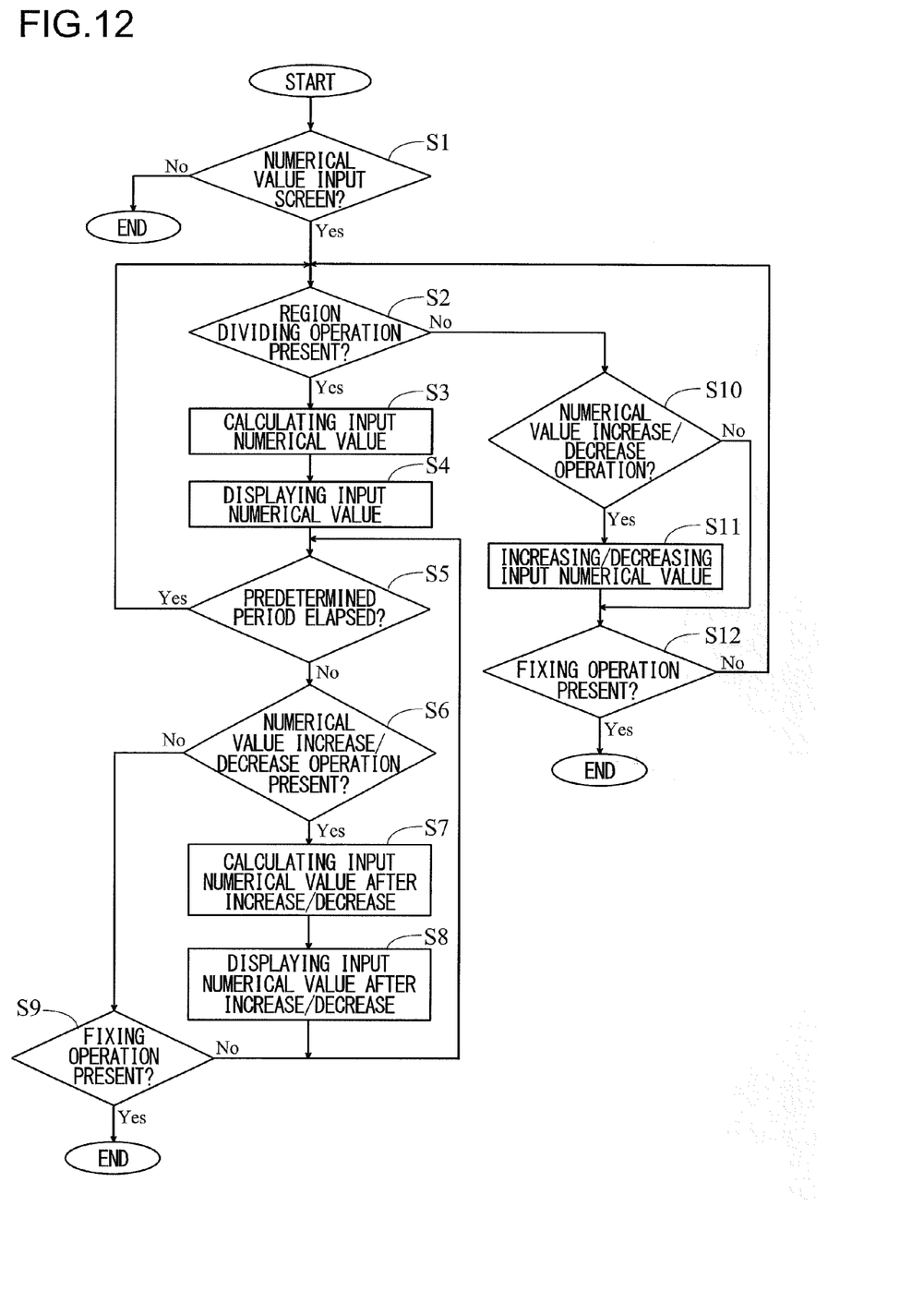
FIG. 12 is a flow chart for describing a control flow when accepting a numerical value input on an operation panel according to an embodiment of the present disclosure.

Hereinafter, with reference to FIG. 12, a control flow at a time of accepting the numerical value input by means of the numerical value input screen 90 is described. In the meantime, a flow chart of FIG. 12 starts when the panel control portion 120 displays a screen on the display portion 82.

In a step S1, the panel control portion 120 determines whether the screen displayed on the display portion 82 is the numerical value input screen 90 or not. As a result of this, if the display screen is the numerical value input screen 90, the process goes to a step S2; if the display screen is not the numerical value input screen 90, the numerical value input is not accepted. In the meantime, in the case where the display screen is the numerical value input screen 90, the numerical value display region 91 in the screen displays, for example, the minimum value in the numerical value input range, the maximum value in the numerical value input range, a default value, a numerical value input before or the like as the input numerical values.

Going to the step S2, the panel control portion 120 determines presence of the region dividing operation on the touch panel portion 83. As a result of this, if it is determined that the region dividing operation is performed, the process goes to a step S3.

Going to the step S3, the panel control portion 120 calculates the input numerical value based on the ratio for input numerical value calculation. And, in a step S4, the panel control portion 120 makes the display portion 82 display the input numerical value that is based on the ratio for input numerical value calculation.

Next, in a step S5, the panel control portion 120 determines whether or not the predetermined period elapses after making the display portion 82 display the input numerical value. As a result of this, if it is determined that the predetermined period elapses, the process goes to the step S2; if the predetermined period does not elapse, the process goes to a step S6. Going to the step S6, the panel control portion 120 determines presence of the numerical value increase/decrease operation on the touch panel portion 83. As a result of this, if it is determined that the numerical value increase/decrease operation is performed, the process goes to a step S7.

Going to the step S7, the panel control portion 120 calculates the input numerical value after the increase/decrease based on the ratio for increase/decrease value calculation. And, in a step S8, the panel control portion 120 makes the display portion 82 display the input numerical value after the increase/decrease that is based on the ratio for increase/decrease value calculation. Thereafter, the process goes to the step S5.

Besides, in the step S6, in a case where the numerical value increase/decrease operation is not performed, the process goes to a step S9. Going to the step S9, the panel control portion 120 determines presence of a fixing operation on the touch panel portion 83. In the meantime, a fixing operation is an operation for fixing the input numerical value in current display, and is, for example, a tap operation of tapping a fixing button B (see FIG. 4 to FIG. 11) disposed in the numerical value input screen 90. As a result of determining presence of a fixing operation on the touch panel portion 83, if it is determined that a fixing operation is performed, the panel control portion 120 ends the acceptance of the numerical value input; if a fixing operation is not performed, the process goes to the step S5.

In the meantime, in the step S2, in a case where the region dividing operation is not performed, the process goes to a step S10. Going to the step S10, the panel control portion 120 determines whether an operation is performed on the numerical value increase/decrease button NB or not. As a result of this, if it is determined that an operation is performed on the numerical value increase/decrease button NB, the process goes to a step S11.

Going to the step S11, based on the operation on the numerical value increase/decrease button NB, the panel control portion 120 increases/decreases the input numerical value to be displayed by the display portion 82. And, the process goes to a step S12. In the meantime, in the step S10, even in a case where an operation is not performed on the numerical value increase/decrease button NB, the process goes to the step S12. Going to the step S12, the panel control portion 120 determines presence of a fixing operation on the touch panel portion 83. As a result of this, if it is determined that an fixing operation is performed, the acceptance of the numerical value input is ended; if a fixing operation is not performed, the process goes to the step S2.

It should be considered that the embodiments disclosed this time are examples in all respects and are not limiting. The scope of the present disclosure is not indicated by the above description of the embodiments but by the claims, and all modifications within the scope of the claims and the meaning equivalent to the claims are covered.

What is claimed is:

1. A display input apparatus comprising:
   a display portion that displays a numerical value input screen for accepting an input of a numerical value and an input numerical value, namely, a numerical value that is input, on a rectangular numerical value display region of the numerical value input screen, the rectangular numerical value display region being long in a left-right direction,
   a touch panel portion that is disposed correspondingly to the display portion and accepts a touch operation on a screen of the display portion, and
   a control portion that detects, based on an output from the touch panel portion, the touch operation accepted by the touch panel portion,
   wherein when the touch panel portion accepts a region dividing operation as a touch operation that slides a touch position in a vertical direction of the numerical value display region, to divide the numerical value display region, where the input numerical value is displayed, along a second direction that meets a first direction, that is, the left-right direction, at right angles,
   the control portion sets beforehand an intermediate line that extends along the first direction between upper and lower edges of the rectangular numerical value display region that is long in the left-right direction, and identifies a line, which passes through an intersection in the second direction between the intermediate line and a line along the slide direction in the region division operation, as a division line, and
   the control portion sets a line, which passes through a predetermined position of the numerical value display region in the second direction, as a first reference line; sets an end edge of the rectangular shape, which is opposite to the first reference line of the numerical value display region in the first direction, as a second reference line; obtains a ratio for input numerical value calculation that is a ratio of a distance from the first reference line to the second reference line and a distance from the first reference line to the division line of the numerical value display region that is divided by the region dividing operation; and obtains a numerical value, which is obtained by multiplying a maximum value or minimum value in a numerical value input range of the numerical value input screen by the ratio for input numerical value calculation, as the input numerical value, and
   the display portion displays the input numerical value, which is obtained by the control portion, in the numerical value input screen.

2. The display input apparatus according to claim 1, wherein
   the display portion divides the numerical value display region at a predetermined division position, and displays a numerical value, which is used as the input numerical value in a case where the region dividing operation is performed to divide the numerical value display region along a line that passes through the division position in the second direction, as a scale.

3. The display input apparatus according to claim 1, wherein
in a case where the numerical value input range of the numerical value input screen does not bridge a positive value and a negative value, the control portion obtains the input numerical value by setting one end edge of both end edges of the numerical value display region, which are opposite to each other in the first direction, as the first reference line and setting another end edge opposite to the one end edge as the second reference line.

4. The display input apparatus according to claim 1, wherein
in a case where the numerical value input range of the numerical value input screen bridges a positive value and a negative value,
the control portion sets a line, which passes, in the second direction, through a predetermined position between both end edges of the numerical value display region opposite to each other in the first direction, as the first reference line; in a case where the region dividing operation is performed on one side of the numerical value display region in the first direction with respect to the first reference line, obtains the ratio for input numerical value calculation by setting an end edge on the one side of the numerical value display region as the second reference line; obtains a numerical value, which is obtained by multiplying a maximum positive value in the numerical value input range of the numerical value input screen by the ratio for input numerical value calculation, as the input numerical value; in a case where the region dividing operation is performed on another side of the numerical value display region opposite to the one side, obtains the ratio for input numerical value calculation by setting an end edge on the other side of the numerical value display region as the second reference line, and obtains a numerical value, which is obtained by multiplying a minimum negative value in the numerical value input range of the numerical value input screen by the ratio for input numerical value calculation, as the input numerical value.

5. The display input apparatus according to claim 1, wherein
in a case where the second reference line and the division line are overlaid on each other, the display portion displays the maximum value or minimum value in the numerical value input range of the numerical value input screen as the input numerical value in the numerical value input screen.

6. The display input apparatus according to claim 1, wherein
in a case where the second reference line and the division line are overlaid on each other, the display portion performs at least one notification of a notification of being unable to input a numerical value and a notification of prompting a re-input of a numerical value.

7. The display input apparatus according to claim 1, wherein
when the touch panel portion accepts the region dividing operation and the touch panel portion accepts again the region dividing operation by a time when a predetermined period elapses after the display portion displays the input numerical value in the numerical value input screen,
the touch panel portion accepts the region dividing operation, which is accepted again by the time when the predetermined period elapses, as a numerical value increase/decrease operation, and
the control portion sets a line, which passes, in the second direction, through a predetermined position between both end edges of the numerical value display region opposite to each other in the first direction, as a third reference line; in a case where the numerical value increase/decrease operation is performed on one side of the numerical value display region in the first direction with respect to the third reference line, sets an end edge on the one side of the numerical value display region as a fourth reference line to obtain a ratio for increase/decrease value calculation that is a ratio of a distance from the third reference line to the fourth reference line and a distance from the third reference line to a division line of the numerical value display region divided by the numerical value increase/decrease operation, and obtains a numerical value, which is obtained by increasing the input numerical value in current display by a numerical value that is obtained by multiplying a predetermined increase/decrease value by the ratio for increase/decrease value calculation, as the input numerical value after increase/decrease; in a case where the numerical value increase/decrease operation is performed on another side of the numerical value display region opposite to the one side, sets an end edge on the other side of the numerical value display region as the fourth reference line to obtain the ratio for increase/decrease value calculation, and obtains a numerical value, which is obtained by decreasing the input numerical value in current display by a numerical value that is obtained by multiplying the predetermined increase/decrease value by the ratio for increase/decrease value calculation, as the input numerical value after increase/decrease, and
the display portion newly displays the input numerical value after the increase/decrease obtained by the control portion instead of the input numerical value in current display.

8. An image forming apparatus comprising the display input apparatus according to claim 1.

9. A method for controlling a display input apparatus that includes: a display portion which displays a numerical value input screen for accepting an input of a numerical value and displays an input numerical value, namely, a numerical value that is input, in the numerical value input screen; and a touch panel portion which is disposed correspondingly to the display portion and accepts a touch operation on a screen of the display portion, the method comprising:
a step in which when the touch panel portion accepts a predetermined region dividing operation as a touch operation that divides a predetermined region in the numerical value input screen along a second direction which meets a first direction at right tangles, a line, which passes, in the second direction, through a predetermined position of the predetermined region, is set as a first reference line, an end edge opposite, in the first direction, to the first reference line of the predetermined region is set as a second reference line, whereby a ratio for input numerical value calculation is obtained, which is, namely, a ratio of a distance from the first reference line to the second reference line and a distance from the first reference line to a division line of the predetermined region divided by the region dividing operation, and a numerical value, which is obtained by multiplying a maximum value or minimum value in a numerical value input range of the numerical value input screen by the ratio for input numerical value calculation, is obtained as the input numerical value, and a step in which the obtained input numerical value is displayed in the numerical value input screen.

10. The display input apparatus according to claim 1, wherein a width between upper and lower edges of the numerical value display region is wider than a finger of a user that performs an operation and the touch operation is an operation that slides vertically between the upper edge and the lower edge to divide the numerical value display region.

* * * * *